United States Patent
Baker et al.

(10) Patent No.: US 9,137,386 B1
(45) Date of Patent: Sep. 15, 2015

(54) FEATURE MANAGEMENT OF A COMMUNICATION DEVICE

(71) Applicant: Kajeet, Inc., Bethesda, MD (US)

(72) Inventors: Matthew Donald Baker, Potomac, MD (US); Steven Ira Geller, Rockville, MD (US); Douglas Owen Kesser, Little Silver, NJ (US); Daniel John Neal, Chevy Chase, MD (US); Carol Ann Politi, Bethesda, MD (US); Ben Julian Weintraub, Vienna, VA (US)

(73) Assignee: KAJEET, INC., McLean, VA (US)

( * ) Notice: Subject to any disclaimer, the term of this patent is extended or adjusted under 35 U.S.C. 154(b) by 57 days.

(21) Appl. No.: 14/076,110

(22) Filed: Nov. 8, 2013

Related U.S. Application Data

(60) Division of application No. 13/786,802, filed on Mar. 6, 2013, now Pat. No. 8,611,885, which is a continuation of application No. 13/763,348, filed on Feb. 8, 2013, now Pat. No. 8,634,801, which is a continuation of application No. 13/603,218, filed on Sep. 4, 2012, now Pat. No. 8,712,371, which is a continuation of application No. 12/950,379, filed on Nov. 19, 2010, now Pat. No. 8,285,249, which is a continuation of application No. 11/881,460, filed on Jul. 26, 2007, now Pat. No. 7,899,438, which is a continuation-in-part of application No. 11/824,336, filed on Jun. 28, 2007, now Pat. No. 7,945,238.

(51) Int. Cl.
*H04W 4/24* (2009.01)
*H04M 15/00* (2006.01)

(52) U.S. Cl.
CPC .................................. *H04M 15/61* (2013.01)

(58) Field of Classification Search
CPC combination set(s) only.
See application file for complete search history.

(56) References Cited

U.S. PATENT DOCUMENTS

| 5,221,838 | A | 6/1993 | Gutman et al. |
| 5,285,382 | A | 2/1994 | Muehlberger et al. |
| 5,704,046 | A | 12/1997 | Hogan |

(Continued)

FOREIGN PATENT DOCUMENTS

| AU | 2006100397 A4 | 3/2007 |
| EP | 0137884 A1 | 7/1983 |

(Continued)

OTHER PUBLICATIONS

U.S. Appl. No. 13/786,986; Non-Final Office Action; dated Oct. 22, 2014; 14 pages.

(Continued)

*Primary Examiner* — Diane Mizrahi
(74) *Attorney, Agent, or Firm* — Baker & Hostetler LLP

(57) ABSTRACT

A system and method for the real-time management of a device, and more particularly to the establishment and enforcement of policies or rules associated with the feature or functions that may be performed with the device, such as making and receiving calls, exchanging data, playing games and music, sending and receiving email, accessing web sites, and paying for goods and services. If a child or employee is using the device, there may be a need to regulate how that device can be used and to determine who will pay for what goods or services. In addition to providing all of the features associated with a device, service providers need to be able to establish and enforce rules (policies) regulating how and when that device can be used and who will pay for a good or service requested by the user of the device.

22 Claims, 5 Drawing Sheets

(56) References Cited

U.S. PATENT DOCUMENTS

| | | | |
|---|---|---|---|
| 5,914,472 | A | 6/1999 | Foladare et al. |
| 5,953,710 | A | 9/1999 | Fleming |
| 6,018,724 | A | 1/2000 | Arent |
| 6,026,291 | A | 2/2000 | Carlsson et al. |
| 6,076,075 | A | 6/2000 | Teicher |
| 6,173,269 | B1 | 1/2001 | Solokl et al. |
| 6,205,436 | B1 | 3/2001 | Rosen |
| 6,249,252 | B1 | 6/2001 | Dupray |
| 6,345,263 | B1 | 2/2002 | Matsumoto et al. |
| 6,529,593 | B2 | 3/2003 | Nelson |
| 6,564,047 | B1 | 5/2003 | Steele et al. |
| 6,885,877 | B1 | 4/2005 | Ozaki et al. |
| 6,957,058 | B2 | 10/2005 | Chan et al. |
| 6,968,198 | B2 | 11/2005 | Nylund |
| 6,990,182 | B2 | 1/2006 | Nelson |
| 7,024,174 | B2 | 4/2006 | Nagy et al. |
| 7,024,390 | B2 | 4/2006 | Mori et al. |
| 7,133,846 | B1 | 11/2006 | Ginter et al. |
| 7,155,411 | B1 | 12/2006 | Blinn et al. |
| 7,206,769 | B2 | 4/2007 | Laurent et al. |
| 7,209,957 | B2 | 4/2007 | Patron et al. |
| 7,248,855 | B2 | 7/2007 | Joyce et al. |
| 7,249,092 | B2 | 7/2007 | Dunn et al. |
| 7,302,272 | B2 | 11/2007 | Ackley |
| 7,330,717 | B2 | 2/2008 | Gidron et al. |
| 7,333,796 | B2 | 2/2008 | Scalisi et al. |
| 7,359,880 | B2 | 4/2008 | Abel et al. |
| 7,434,723 | B1 | 10/2008 | White et al. |
| 7,457,609 | B2 | 11/2008 | Cai |
| 7,516,219 | B2 | 4/2009 | Moghaddam et al. |
| 7,580,699 | B1 | 8/2009 | Shaw et al. |
| 7,593,714 | B2 | 9/2009 | Schultz et al. |
| 7,869,790 | B2 | 1/2011 | Singh et al. |
| 7,869,792 | B1 | 1/2011 | Zhou et al. |
| 7,873,538 | B2 | 1/2011 | Karaoguz et al. |
| 7,881,697 | B2 | 2/2011 | Baker et al. |
| 7,899,438 | B2 | 3/2011 | Baker et al. |
| 7,933,799 | B2 | 4/2011 | Aaltonen et al. |
| 7,945,238 | B2 | 5/2011 | Baker et al. |
| 7,945,242 | B2 | 5/2011 | Kahn |
| 8,019,354 | B2 | 9/2011 | Rae et al. |
| 8,068,825 | B2 | 11/2011 | Mikan et al. |
| 8,078,140 | B2 | 12/2011 | Baker et al. |
| 8,285,249 | B2 | 10/2012 | Baker et al. |
| 8,340,638 | B2 | 12/2012 | Patterson et al. |
| 8,577,795 | B2 | 11/2013 | Clubb et al. |
| 8,588,735 | B1 | 11/2013 | Baker et al. |
| 8,594,619 | B1 | 11/2013 | Baker et al. |
| 8,600,348 | B1 | 12/2013 | Baker et al. |
| 8,611,885 | B1 | 12/2013 | Baker et al. |
| 8,630,612 | B1 | 1/2014 | Baker et al. |
| 8,634,801 | B1 | 1/2014 | Baker et al. |
| 8,634,802 | B1 | 1/2014 | Baker et al. |
| 8,634,803 | B1 | 1/2014 | Baker et al. |
| 8,654,687 | B2 | 2/2014 | Koorapaty et al. |
| 8,693,358 | B2 | 4/2014 | Hodges |
| 8,698,741 | B1 | 4/2014 | Wang et al. |
| 8,732,073 | B2 * | 5/2014 | Thomas .................. 705/38 |
| 8,817,699 | B2 | 8/2014 | Liu et al. |
| 2001/0007983 | A1 | 7/2001 | Lee |
| 2001/0011250 | A1 | 8/2001 | Paltenghe et al. |
| 2001/0032192 | A1 | 10/2001 | Putta et al. |
| 2001/0047310 | A1 | 11/2001 | Russell |
| 2002/0022472 | A1 | 2/2002 | Watler et al. |
| 2002/0055911 | A1 | 5/2002 | Guerreri |
| 2002/0123938 | A1 | 9/2002 | Yu et al. |
| 2002/0176553 | A1 | 11/2002 | Aschir |
| 2002/0178118 | A1 | 11/2002 | Hamilton et al. |
| 2002/0179704 | A1 | 12/2002 | Deaton |
| 2002/0187772 | A1 | 12/2002 | Hyyppa et al. |
| 2002/0193102 | A1 | 12/2002 | Hyyppa et al. |
| 2003/0026404 | A1 * | 2/2003 | Joyce et al. ............ 379/144.01 |
| 2003/0055785 | A1 | 3/2003 | Lahiri |
| 2003/0083954 | A1 | 5/2003 | Namba |
| 2003/0182420 | A1 | 9/2003 | Jones et al. |
| 2003/0220835 | A1 | 11/2003 | Barnes, Jr. |
| 2004/0111329 | A1 | 6/2004 | Moore |
| 2004/0132438 | A1 | 7/2004 | White |
| 2004/0139018 | A1 | 7/2004 | Anderson et al. |
| 2004/0143550 | A1 | 7/2004 | Creamer et al. |
| 2004/0198335 | A1 | 10/2004 | Campen |
| 2004/0229600 | A1 | 11/2004 | Saez et al. |
| 2004/0235457 | A1 | 11/2004 | Florkey et al. |
| 2004/0236688 | A1 | 11/2004 | Bozeman |
| 2004/0253941 | A1 | 12/2004 | Rivera et al. |
| 2005/0013423 | A1 | 1/2005 | Eversen et al. |
| 2005/0096009 | A1 | 5/2005 | Ackley |
| 2005/0113130 | A1 | 5/2005 | Weinzierl |
| 2005/0171715 | A1 | 8/2005 | Saitoh et al. |
| 2005/0216424 | A1 | 9/2005 | Gandre et al. |
| 2005/0282559 | A1 | 12/2005 | Erskine et al. |
| 2006/0019632 | A1 | 1/2006 | Cunningham et al. |
| 2006/0025139 | A1 | 2/2006 | Bales et al. |
| 2006/0116105 | A1 | 6/2006 | Frankel et al. |
| 2006/0135140 | A1 | 6/2006 | Rothman et al. |
| 2006/0252410 | A1 | 11/2006 | Bakita et al. |
| 2006/0276180 | A1 | 12/2006 | Henry, Jr. |
| 2006/0293057 | A1 | 12/2006 | Mazerski et al. |
| 2007/0003034 | A1 | 1/2007 | Schultz et al. |
| 2007/0004386 | A1 | 1/2007 | Singh et al. |
| 2007/0021102 | A1 | 1/2007 | Sherman |
| 2007/0058812 | A1 | 3/2007 | Ali et al. |
| 2007/0060100 | A1 | 3/2007 | Watler et al. |
| 2007/0077911 | A1 | 4/2007 | Raman |
| 2007/0095892 | A1 | 5/2007 | Lyons et al. |
| 2007/0099609 | A1 | 5/2007 | Cai |
| 2007/0105529 | A1 | 5/2007 | Lundstrom et al. |
| 2007/0125840 | A1 | 6/2007 | Law et al. |
| 2007/0135135 | A1 | 6/2007 | Brown |
| 2007/0155364 | A1 | 7/2007 | Andersson |
| 2007/0164098 | A1 | 7/2007 | Khalid et al. |
| 2007/0172039 | A1 | 7/2007 | Mendiola et al. |
| 2007/0179974 | A1 | 8/2007 | Cai et al. |
| 2007/0198432 | A1 | 8/2007 | Pitroda et al. |
| 2007/0243862 | A1 | 10/2007 | Coskun et al. |
| 2007/0245026 | A1 | 10/2007 | Martin et al. |
| 2007/0267479 | A1 | 11/2007 | Nix et al. |
| 2007/0277230 | A1 | 11/2007 | Hawkins et al. |
| 2008/0014904 | A1 | 1/2008 | Crimi et al. |
| 2008/0015881 | A1 | 1/2008 | Shankar |
| 2008/0033880 | A1 | 2/2008 | Fiebiger et al. |
| 2008/0039189 | A1 | 2/2008 | Walker et al. |
| 2008/0096524 | A1 | 4/2008 | True et al. |
| 2008/0119162 | A1 | 5/2008 | Sivalingam et al. |
| 2008/0130849 | A1 | 6/2008 | Mock et al. |
| 2008/0146211 | A1 | 6/2008 | Mikan et al. |
| 2008/0146259 | A1 | 6/2008 | Chin et al. |
| 2008/0312968 | A1 | 12/2008 | Hannon et al. |
| 2009/0119132 | A1 | 5/2009 | Bolano et al. |
| 2010/0064341 | A1 | 3/2010 | Aldera |
| 2012/0044807 | A1 | 2/2012 | Johnson et al. |
| 2012/0149337 | A1 | 6/2012 | Singh et al. |
| 2013/0029653 | A1 | 1/2013 | Baker |
| 2013/0030828 | A1 * | 1/2013 | Pourfallah et al. ................ 705/2 |
| 2013/0065555 | A1 | 3/2013 | Baker et al. |
| 2013/0183937 | A1 | 7/2013 | Neal |

FOREIGN PATENT DOCUMENTS

| | | |
|---|---|---|
| EP | 0172670 A2 | 2/1986 |
| EP | 1041520 A2 | 4/2000 |
| EP | 1072997 A1 | 1/2001 |
| EP | 1132839 A1 | 9/2001 |
| EP | 1450322 A1 | 8/2004 |
| EP | 1528513 A1 | 5/2005 |
| EP | 1798659 A1 | 6/2007 |
| EP | 1798943 A1 | 6/2007 |
| FR | 2863088 B2 | 6/2005 |
| GB | 2419970 A | 5/2006 |
| GB | 2425621 A | 11/2006 |
| GB | 2431072 A | 4/2007 |
| JP | 59-062976 A | 4/1984 |
| JP | 9-179921 A | 7/1997 |
| JP | 9-185658 A | 7/1997 |

(56) References Cited

FOREIGN PATENT DOCUMENTS

| | | | |
|---|---|---|---|
| JP | 12-48144 A | 2/2000 | |
| JP | 12-251154 A | 9/2000 | |
| JP | 12-331100 A | 11/2000 | |
| JP | 13-134689 A | 5/2001 | |
| JP | 13-291039 A | 10/2001 | |
| JP | 15-209880 A | 7/2003 | |
| JP | 16-102726 A | 4/2004 | |
| JP | 18-139433 A | 6/2006 | |
| JP | 18-309786 A | 11/2006 | |
| JP | 19-323337 A | 12/2007 | |
| KR | 2001088369 A | 9/2001 | |
| KR | 2002010160 A | 2/2002 | |
| KR | 2002016161 A | 3/2002 | |
| KR | 2003044475 A | 6/2003 | |
| KR | 2004089144 A | 10/2004 | |
| KR | 2005048166 A | 5/2005 | |
| KR | 2007018329 A | 2/2007 | |
| WO | WO 01/35353 | 5/2001 | |
| WO | WO 02/084989 A2 | 10/2002 | |
| WO | WO 03/092348 A2 | 11/2003 | |
| WO | WO 2004/100094 A2 | 11/2004 | |
| WO | WO 2005/015831 A2 | 2/2005 | |
| WO | WO 2005/017793 A1 | 2/2005 | |
| WO | WO 2005/081664 A2 | 9/2005 | |

OTHER PUBLICATIONS

U.S. Appl. No. 13/744,342, filed Jan. 17, 2013, Neal.
U.S. Appl. No. 13/763,348, filed Feb. 8, 2013, Baker et al.
U.S. Appl. No. 13/786,735, filed Mar. 6, 2013, Baker et al.
U.S. Appl. No. 13/786,754, filed Mar. 6, 2013, Baker et al.
U.S. Appl. No. 13/786,775, filed Mar. 6, 2013, Baker et al.
U.S. Appl. No. 13/786,788, filed Mar. 6, 2013, Baker et al.
U.S. Appl. No. 13/786,802, filed Mar. 6, 2013, Baker et al.
U.S. Appl. No. 13/786,685, filed Mar. 6, 2013, Baker et al.
U.S. Appl. No. 13/786,694, filed Mar. 6, 2013, Baker et al.
U.S. Appl. No. 13/786,703, filed Mar. 6, 2013, Baker et al.
U.S. Appl. No. 13/786,730, filed Mar. 6, 2013, Baker et al.
U.S. Appl. No. 13/786,745, filed Mar. 6, 2013, Baker et al.
U.S. Appl. No. 13/786,922, filed Mar. 6, 2013, Baker et al.
U.S. Appl. No. 13/786,950, filed Mar. 6, 2013, Baker et al.
U.S. Appl. No. 13/786,966, filed Mar. 6, 2013, Baker et al.
U.S. Appl. No. 13/786,986, filed Mar. 6, 2013, Baker et al.
U.S. Appl. No. 13/787,004, filed Mar. 6, 2013, Baker et al.
U.S. Appl. No. 13/786,917, filed Mar. 6, 2013, Baker et al.
U.S. Appl. No. 13/786,949, filed Mar. 6, 2013, Baker et al.
U.S. Appl. No. 13/786,974, filed Mar. 6, 2013, Baker et al.
U.S. Appl. No. 13/787,610, filed Mar. 6, 2013, Baker et al.
U.S. Appl. No. 13/787,111, filed Mar. 6, 2013, Baker et al.
Boyd, "Here Comes The Wallet Phone", *IEEE Spectrum*, Nov. 12-14, 2005, www.spectrum.ieee.org.
Carstens, "Mechanism for Compiling Payment Information on Mobile Terminals", IP.com, #IPCOM000124834D, originally published Jun. 20, 2005, IP.com published Jun. 20, 2005.
Creus et al., "Feature Interaction Control on Smartphones", *IEEE*, 2007, 302-309.
Diesposti et al., "Dual-Use Personal NavCom Service", *IEEE*, 2000, 69-79, 0/7803-5846-5/00.
Ebringer et al., "Parasitic Authentication to Protect Your E-Wallet", *IEEE Computer*, Oct. 2000, 54-60, 0018-9162/00.
Hung et al., "Security and Privacy Aspects of SmartFlow Internet Payment System", *IEEE*,1999.
IBM TDB, "Micropayment Scheme", IP.com, #IPCOM000013249D, originally published Apr. 1, 2001, IP.com published Jun. 18, 2003.
Integrated Mobile, Inc., Family-friendly Mobile Services, Presentation, Executive Overview, Nov. 10, 2003, 1-39.
Ishikawa et al., "Mixed-Reality 'Party-Line Night Club'—Synchronization of Networked Avatars and Applications with Mobile Phone Ringtones: Integrating Java3d and LAN-tap Roomware with J2ME", *Proceedings of the 2005 The Fifth International Conference on Computer and Information Technology (CIT'05)*, IEEE, 2005, 0/7695-2432-X/05.
Kostov et al., "Cellular Phone Ringing Tone Recommendation System Based on Collaborative Filtering Method", *IEEE*, 2003, 378-383, 0/7803-7866-0/03.
Labrou et al., "Wireless Wallet", *Proceedings of the First Annual International Conference on Mobile and Ubiquitous Systems: Networking and Services*, 2004.
Lee et al., "i-Ring: A System for Humming Transcription and Chord Generation", *IEEE*, 2004, 1031-1034, 0/7803-8603-5/04.
Lennox, "Feature Interaction in Internet Telephony," Sixth Feature Interaction Workshop, Columbia University, May 17, 2000, 15 pages.
Leung et al., "On Designing a Flexible E-Payment System with Fraud Detection Capability", *Proceedings of the IEEE International Conference on E-Commerce Technology*, 2004, 07695-2098-7/04.
Me et al., "EC-Pay: An Efficient and Secure ECC-based Wireless Local Payment Scheme", *Proceedings of the Third International Conference on Information Technology and Applications*, 2005.
Mjolsnes et al., "On-line E-Wallet System with Decentralized Credential Keepers", *Mobile Networks and Applications 8*, published by Kluwer Academic Publishers, 2003, 87-99.
Pierce et al., "RF Wallet With Fraud Protection", IP.com, #IPCOM000009305D, originally published Jun. 1, 1999, IP.com published Aug. 15, 2002.
Raposo et al., "A Web Agent for Automating E-Commerce Operations", *Proceedings of the IEEE International Conference on E-Commerce*, 2003.
Schmandt et al., "Impromptu: Managing Networked Audio Applications for Mobile Users", *ACM*, 2004, 59-69, 1-58113-793-1/04/0006.
Tang et al., "Distributed Family Wallet Architecture and Secure Inter-Pure Operations", *IEEE*, 2000, 110-111, 0/7803-6301-9/00.
Varshney, "Location Management for Mobile Commerce Applications in Wireless Internet Environment", *ACM Transactions on Internet Technology*,Aug. 2003, 3(3), 236-255.
Yang et al., "A Three-Party Authenticated Key Exchange Scheme Smartcard Using Elliptic Curve Cryptosystem for Secure Key Exchange in Wireless Sensor Network", *IEEE*, 2007.
U.S. Appl. No. 13/603,218: Non-Final Office Action dated Dec. 24, 2012, 6 pages.
U.S. Appl. No. 13/603,218: Final Office Action dated Jun. 10, 2013, 15 pages.
U.S. Appl. No. 13/786,735: Non-Final Office Action dated Jun. 7, 2013, 43 pages.
U.S. Appl. No. 13/786,754: Non-Final Office Action dated Jun. 4, 2013, 36 pages.
U.S. Appl. No. 13/786,775: Non-Final Office Action dated Jun. 5, 2013, 26 pages.
U.S. Appl. No. 13/786,788: Non-Final Office Action dated Jun. 28, 2013, 24 pages.
U.S. Appl. No. 13/786,685: Non-Final Office Action dated Jun. 14, 2013, 23 pages.
U.S. Appl. No. 13/786,694: Non-Final Office Action dated Jun. 20, 2013, 70 pages.
U.S. Appl. No. 13/786,703: Non-Final Office Action dated Jun. 28, 2013, 34 pages.
U.S. Appl. No. 13/786,730: Non-Final Office Action dated Jul. 17, 2013, 30 pages.
U.S. Appl. No. 13/786,745: Non-Final Office Action dated May 31, 2013, 33 pages.
U.S. Appl. No. 13/786,922: Non-Final Office Action dated Jun. 20, 2013, 25 pages.
U.S. Appl. No. 13/786,950: Non-Final Office Action dated Jun. 20, 2013, 28 pages.
U.S. Appl. No. 13/786,966: Non-Final Office Action dated Jun. 20, 2013, 30 pages.
U.S. Appl. No. 13/786,986: Non-Final Office Action dated Jun. 5, 2013, 23 pages.
U.S. Appl. No. 13/787,004: Non-Final Office Action dated Aug. 5, 2013, 25 pages.
U.S. Appl. No. 13/786,917: Non-Final Office Action dated Aug. 5, 2013, 17 pages.

(56) References Cited

OTHER PUBLICATIONS

U.S. Appl. No. 13/786,949: Non-Final Office Action dated Aug. 5, 2013, 17 pages.
U.S. Appl. No. 13/763,348: Non-Final Office Action dated Jun. 21, 2013, 21 pages.
U.S. Appl. No. 13/786,974: Non-Final Office Action dated Jul. 5, 2013, 22 pages.
U.S. Appl. No. 13/787,610: Non-Final Office Action dated Jul. 19, 2013, 21 pages.
Declaration of Matthew Donald Baker, Steven Ira Geller, Douglas Owen Kesser, Daniel John Neal, Carol Ann Politi and Ben Julian Weintraub Under 37 C.F.R. § 1.131, filed with the USPTO in U.S. Appl. No. 13/786,735 on Sep. 9, 2013, 3,757 pages.
U.S. Appl. No. 13/603,218: Non-Final Office Action dated Nov. 27, 2013, 12 pages.
U.S. Appl. No. 13/786,754: Notice of Allowance dated Oct. 18, 2013, 12 pages.
U.S. Appl. No. 13/786,775: Notice of Allowance dated Sep. 24, 2013, 6 pages.
U.S. Appl. No. 13/786,802: Non-Final Office Action dated Jul. 2, 2013, 9 pages.
U.S. Appl. No. 13/786,802: Notice of Allowance dated Nov. 1, 2013, 7 pages.
U.S. Appl. No. 13/786,685: Non-Final Office Action dated Jan. 2, 2014, 30 pages.
U.S. Appl. No. 13/786,703: Notice of Allowance dated Nov. 25, 2013, 34 pages.
U.S. Appl. No. 13/786,730: Notice of Allowance dated Dec. 18, 2013, 15 pages.
U.S. Appl. No. 13/786,745: Notice of Allowance dated Sep. 16, 2013, 6 pages.
U.S. Appl. No. 13/786,922: Notice of Allowance dated Dec. 6, 2013, 12 pages.
U.S. Appl. No. 13/786,950: Notice of Allowance dated Dec. 11, 2013, 12 pages.
U.S. Appl. No. 13/787,004: Notice of Allowance dated Dec. 10, 2013, 12 pages.
U.S. Appl. No. 13/763,348: Notice of Allowance dated Dec. 9, 2013, 12 pages.
U.S. Appl. No. 13/787,610: Notice of Allowance dated Dec. 16, 2013, 12 pages.
U.S. Appl. No. 13/787,111: Non-Final Office Action dated Nov. 12, 2013, 17 pages.

* cited by examiner

FIG. 4

FEATURE MANAGER

To use the Feature Manager, first select the appropriate child on your account.

Show features for [Mike] → [Go] ⎫
⎬ 50
⎭

Feature Selections for Mike

Here you can select the features that Mike can use on his kajeet phone. To change the setting for a particular feature, click the appropriate "Edit Setting" link.

Ringtones, Wallpaper, games & Applications       Allowed       Edit Settings

Ringtones, wallpaper, games and application are all files that can be downloaded to your child's phone. Ringtones and wallpaper allow your kid to personalize the phone and games and application entertain or enable your kid to do something (E.G. GoogleMaps can help your kid find their way.) ⎫ 52

Feeds       Allowed       Edit Settings

Feeds enable your child to receive text messages for a particular topic, sent by kajeet. For example, kajeet offers sports, horoscopes and other feeds. Kajeet text messaging rates apply. ⎫ 54

Mobile Web Surfing       Not Allowed       Edit Settings

Your child can surf the mobile web from the kajeet phone to check email or other web sites. ⎫ 56

Picture Messaging       Allowed       Edit Settings

With picture messaging your child can snap a picture with a kajeet camera phone and send it in a picture message to a friend, or receive picture messages. ⎫ 58

Instant Messaging       Unlimited Monthly       Edit Settings

With AOL Instant Messaging on your kajeet phone, you can send unlimited instant messages to anyone anywhere anytime. ⎫ 60

Feeds

Feeds enable your child to receive text messages for a particular topic, sent by kajeet. For example, kajeet offers sports, horoscopes and other feeds. Kajeet text messaging rates apply. Note: selecting "Not allowed" disables all text messaging.

Do you want Mike to be able to subscribe to feeds?

◉ Allowed

◉ Not Allowed

[ Save Settings ]

FIG. 5

FEATURE MANAGEMENT OF A COMMUNICATION DEVICE

CROSS REFERENCE TO RELATED APPLICATIONS

This application is a divisional of U.S. patent application Ser. No. 13/786,802, filed on Mar. 6, 2013; which is a continuation of U.S. patent application Ser. No. 13/763,348, filed on Feb. 8, 2013, which is a continuation of U.S. patent application Ser. No. 13/603,218, filed on Sep. 4, 2012, which is a continuation of U.S. patent application Ser. No. 12/950,379 filed on Nov. 19, 2010, now U.S. Pat. No. 8,285,249, issued on Oct. 9, 2012, which is a continuation of U.S. patent application Ser. No. 11/881,460 filed on Jul. 26, 2007, now U.S. Pat. No. 7,899,438, issued on Mar. 1, 2011, which is a Continuation-In-Part of U.S. patent application Ser. No. 11/824,336 filed on Jun. 28, 2007, now U.S. Pat. No. 7,945,238, issued on May 17, 2011, the contents of which are incorporated herein by reference in their entirety.

This application is related by subject matter to that which is disclosed in the following commonly assigned application: U.S. patent application Ser. No. 13/786,735; U.S. patent application Ser. No. 13/786,754; U.S. patent application Ser. No. 13/786,775; U.S. patent application Ser. No. 13/786,788; U.S. patent application Ser. No. 13/786,685; U.S. patent application Ser. No. 13/786,694; U.S. patent application Ser. No. 13/786,703; U.S. patent application Ser. No. 13/786,730; U.S. patent application Ser. No. 13/786,745; U.S. patent application Ser. No. 13/786,922; U.S. patent application Ser. No. 13/786,950; U.S. patent application Ser. No. 13/786,966; U.S. patent application Ser. No. 13/786,986; U.S. patent application Ser. No. 13/787,004; U.S. patent application Ser. No. 13/786,917; U.S. patent application Ser. No. 13/786,949; U.S. patent application Ser. No. 13/786,974; U.S. patent application Ser. No. 13/787,610; U.S. patent application Ser. No. 13/787,111; all filed on Mar. 6, 2013 and all entitled "Feature Management of a Communication Device," the entirety of each application is hereby incorporated by reference herein. This application is also related by subject matter to that which is disclosed in U.S. patent application Ser. No. 12/027,240, filed Feb. 6, 2008, now U.S. Pat. No. 7,881,697, issued Feb. 1, 2011; and to that which is disclosed in U.S. patent application Ser. No. 12/950,291, filed Nov. 19, 2010, now U.S. Pat. No. 8,078,140, issued Dec. 13, 2011 the entirety of each application is hereby incorporated by reference herein.

TECHNICAL FIELD

The present invention is directed to the real-time management of a device, and more particularly to the establishment and enforcement of policies or rules associated with the feature or functions that may be performed with the device. Modern communication devices are capable of many things, including making and receiving calls, exchanging data, playing games and music, sending and receiving email, accessing web sites, and paying for goods and services. Depending on who is using the communication device, such as a child or an employee, there may be a need or desire to regulate how that communication device can be used and to determine who will pay for what goods or services. In addition to providing all of the features associated with a device, service providers need to be able to establish and enforce rules (policies) regulating how and when that device can be used and who will pay for a good or service requested by the user of the device.

BACKGROUND

Postpaid cellular phone (cell phone) services typically allow the user of a cell phone to spend unlimited amounts of money for services. In other words, there is nothing to stop the user from running up a huge cell phone bill. Many parents have experienced this issue with their children, prompting the parents to take their children's phones away or to otherwise restrict their children's access to the phones. Unfortunately, modern society requires that parents have the ability to contact their children by cell phone and vice versa, so the cell phones are often returned to the children despite the possibility of future abuse.

The same type of issue exists between employers and employees and other parties in similar administrator/user relationships with respect to the use/abuse of cell phones and other devices. For example, an employer may want an employee to have a communications or mobile computing device, but may not want to pay for certain services or applications that the employee can access with the device or may want to limit how, when, and how much of those services or applications can be used by the employee. Likewise, a government agency or school might be willing to pay for or subsidize certain communications services or applications, but not others. Without the ability to somehow restrict the employee's ability to use services or applications that the employer does not want to pay for or to shift payment obligations for those services or applications to the employee, many employers are forced to give their employees the devices anyway and hope for the best.

One partial solution to the problems associated with postpaid cellular phone abuse is the prepaid cellular phone. Prepaid phone services limit spending because the user of the phone can only use what has been paid for in advance. Many children, however, are not responsible or mature enough to adequately track and maintain their prepaid phone service accounts, and many parents have too many other obligations to keep close track of their children's cell phone use, so as to make sure the phone service accounts are adequately funded all of the time. The net result can be disastrous. For example, if a child uses up all of the funds in their prepaid account, and their phone service provider shuts down access to its services, the child will not be able to call a parent in the event of an emergency, or arrange to be picked up after school or a sporting event, etc.

Thus, a prepaid phone service does not solve the problem of ensuring availability of key services even if the prepaid account has run out of money. In addition to insuring the safety of their children, many parents, employers and others would like to be able to exercise administrative control over the services and activities that a child, employee, etc., is allowed to pay for out of their prepaid account, but prepaid accounts have not been structured to provide such administrative control or feature management. Feature management can encompass many activities, such as preventing a feature or service from being used entirely, limiting how much a feature or service can be used in a given time period, or limiting when a given feature or service can be used (i.e. time of day, days in month, etc).

Prior attempts by prepaid service providers to address these problems have only resulted in partial solutions. Some service providers have provided for rollover usage minutes, which are minutes that were not used as part of a user's service plan and are allowed to roll over to the same user for use in the next month. In some cases, this might prevent a user from running out of minutes in the next month, but it does not guarantee that the user will not use up all of their monthly minutes, plus the rollover minutes, and be denied access to key services anyway. Other service providers have provided an automated refill service, which automatically bills some amount to a credit card to recharge the user's prepaid account in the event the balance in the user's account gets too low. However, a prepaid phone service with an automated refill service is the equivalent of a postpaid phone service and would therefore have the same problem with potential abuse as a postpaid service. In other words, there is no spending limit on the phone service.

Postpaid services have also attempted to address these problems by offering users unlimited usage packages that limit a user's exposure to running up charges. However, for parents who are also interested in preventing their children from sending 300 text messages per day with their phone, or running up a huge bill for services that are not included in the "unlimited usage package," such as downloaded games or ringtones, unlimited usage offerings are not a complete solution. Another partial solution is to provide the administrator (parent) with an alert when a user has reached some limit for a service. For example, a parent could be alerted when a child has spent more than $10 on text messages within a certain period of time. An alert, however, does not actually limit usage of the service, it just warns the parent that the limit has been reached, at which point the parent has to intervene to prevent further abuse, such as by taking the phone away from the child, which is one of the problems with postpaid services in the first place.

It is further known in the art to provide an account for a user of a prepaid phone, such as a cellular phone, in which funds are stored electronically for future use of the phone. For example, a service provider could establish an account for a user, in which funds can be stored, such as through use of a credit card charge or electronic transfer from a bank account. In some cases, corporate customers with multiple users under the same service provider might be able to have a single account for their business, with subaccounts assigned to certain phones and charged to the particular departments within the corporation to which the employees using those phones correspond. Some service providers also provide affinity accounts, which include special rates and promotions for groups of people belonging to a similar business, club, etc. In each case, however, these accounts operate separate from one another in that all of the charges for a particular phone are charged to a particular account, rather than some charges being billed to one account while other charges are billed to another account. The same is true with respect to discounts and promotions, i.e., a discount or promotion is either applied to an existing account or it is not.

Finally, it is further known to establish some measure of parental or administrative control over an account. The Telcordia™ Converged Real-Time Charging system allows users to place limited real-time controls over prepaid and postpaid accounts. For example, when an account allows a child to download premium data (data for which a charge is imposed), parental controls over that account can be set to limit that child's spending within a set of parameters. This system and other solutions, however, are only partial solutions to the problem of providing limits on overspending and other activities by the user while simultaneously assuring that the user will always be able to use the phone when appropriately needed.

BRIEF DESCRIPTION OF THE DRAWINGS

FIG. 4 is a block diagram illustrating a feature management feature; and

FIG. 5 is a block diagram illustrating an edit setting screen for feeds based on the feature management feature of FIG. 4.

DETAILED DESCRIPTION OF ILLUSTRATIVE EMBODIMENTS

Figure 1:
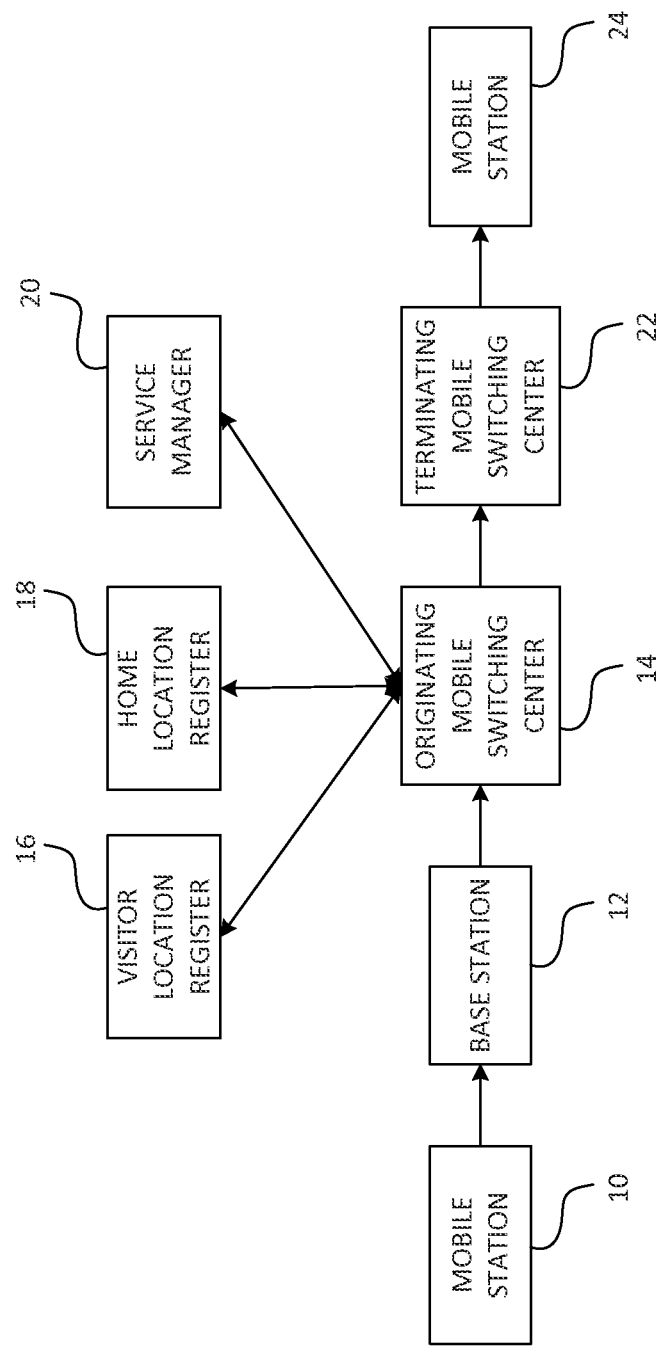
FIG. 1 is a flow chart illustrating, at a high-level, the process of initiating and permitting a service to be initiated.

The present invention is directed to the real-time management of a device in general, and more particularly to the management of a phone by an administrator, such as a parent, guardian, financier, employer, supervisor, or responsible party, who can specifically control the use of the phone through management of its features and the wallets associated with the phone. In the context of the present invention, a wallet is like an electronic account that has certain added features that accounts do not have and which can be used in additional ways that accounts are not used. A wallet can also be a singular item that includes a number of control features or a collection of items, each having their own control features, which operate in conjunction or cooperate with one another to achieve the same purpose as a singular item.

An account would typically include configuration settings for different services available to a user assigned to the account, would include a user's profile information, and would provide the user with the ability to manage the features that are activated for the account. Feature management can be implemented with or without wallets, but is illustrated herein with wallets to provide a more thorough explanation of how feature management works. Some of the features of a wallet that are added to an account include how money is entered into the wallet, who holds or has access to the wallet, the rules that apply to how each wallet can be used for different services, and the hierarchical use of the wallets for each service.

Managing features associated with a phone empowers the administrator to control how the phone is used and goods and services are paid. For example, a common problem with providing a child a cell phone is that they have free reign over downloading ringtones and games. Through feature management, rules can be established for managing the downloading of content, including:
  turning off the download capability entirely;
  limiting how many ringtones and/or games can be purchased in a given time frame;
  sending alerts when a certain dollar or unit threshold has been reached over a given time frame;
  choosing to have the administrator pay for specific types of content, like educational applications or work productivity applications;
  using a pre-defined or dynamically-created filter on such things as downloadable content or surfable Web sites (i.e. set to only allow games to be purchased with an "E" rating); or
  choosing the time frame (time of day, days of week, etc.) when downloads can Occur.

Wallets also differ from accounts in that multiple wallets can be tied to a single device, such as a phone, a single wallet can be tied to multiple devices, and wallets can be completely dynamic, i.e., the wallet is not tied to any one device. For example, a dynamic wallet could be a "picture messaging" wallet, where that wallet is only used for photo services, which may be funded by the administrator, the user of the phone, or an outside party (i.e. friends or family). That dynamic wallet could apply to a single user's wallet, or across multiple wallets in a given account (i.e. across children in a family or employees in a company).

Additional wallets can also be used as back up payment sources for a single wallet associated with a device. These additional wallets can be set up to automatically cover the cost of specific services for the device or as back-up for the user wallet in the event it runs low on funds. If the user of a prepaid phone is a child that needs to call their mother, but the child's wallet is low on funds, the mother's wallet could be used to cover the cost of the call from the child to her. For even greater security, the mother's wallet could be backed by a credit card that automatically adds funds to the wallet when needed so there could be no possibility of the mother's wallet running out of money.

It should be noted that although the term "funds" is used herein to refer to the value stored in or charged to a wallet, an electronic wallet could also be used to store and spend almost any type of unit of value, whether money, credits, or some other indicator.

Returning to the example above, the wallets assigned to the child's phone could also be arranged so that calls with family members were always covered by the parent's wallets, but calls with the child's friends were always covered by the child's wallet. Other services, in addition to calls, such as downloads of games, wallpaper, ring tones, etc., or the sending and receiving of SMS text messages, could be allocated between the different wallets as well, with some services being paid by the parent, some services being paid by the child, or any other arrangement they prefer.

Requiring a child to pay for certain services can be a very effective way to help teach that child the difference between "want" versus "need," which tends to be much clearer to children when they are forced to buy something they "want," but do not "need," with their own money.

Of course, the organization and structure of wallets is not limited to just phones for children. Such wallets are effective tools for any phone user that requires some level of supervision, such as a handicapped individual, a person suffering from dementia, a corporate employee, or even an adult that has shown poor judgment in the past and requires help managing their affairs. Additionally, wallets could support a wide and various range of devices including communications, computing or game devices and a range of users and administrators including corporate sponsors, government agencies, schools, healthcare providers and employers. For example, a phone associated with a user wallet and an administrator wallet could be provided to an employee, such as a child care provider, that enabled the child care provider to only call or receive calls from a parent of the child being watched, and emergency services, but no one else. Alternatively, the phone could be set up without restrictions, but with multiple wallets that allocated out the expense of calls to the appropriate parties. For example, calls to and from parents could be managed so as to be paid by the parents, along with emergency calls and other such things, whereas all other calls, such as personal calls by the child care provider, could be managed so as to be paid for out of the child care provider's wallet.

Additional wallets, such as promotional wallets established by the phone service provider, could be used to cover the cost of other services, for a specified period of time, for a specified number of services, or for any of numerous other purposes. Likewise, dynamic wallets could be established that could be used in association with any device and/or other wallets for any purpose, whenever the owner of the dynamic wallet so chooses.

With respect to any device/phone for which one or more wallets are established, there would be an administrator, such as a parent, employer, guardian, etc. The administrator would be responsible for establishing the rules or parameters under which the phone and the phone user's wallet could be used. If so desired, the administrator could establish an administrator's wallet that was tied to the same phone or multiple phones and establish additional rules or parameters under which the administrator's wallet could be used in place of or in conjunction with the user's wallet. As the administrator for one or more phone wallets, the administrator could also move money between different wallets. This would enable a family or company to manage their phone service budget in a manner that was not possible with a traditional bulk "shared plan," i.e., a 1000 minute/month voice bundle, where every user assigned to the plan had an equal ability to use the plan.

Before explaining feature management and wallets in greater detail, the manner in which wallets can be utilized in a telecommunications network will first be described. Although wallets could be implemented in any type of situation, a mobile telecommunications network is referenced in FIG. 1 as a particularly appropriate environment for the implementation of wallets. Wallets, however, could be associated with any type of device that is subject to use by someone other than the administrator and that can be in communication with an appropriate control network. This type of device is referenced herein as a communication device, not because the device is used for communication, but because it is capable of being in communication with the control network. Hence, the device could be a PDA, a photocopier, a game, a computer, a network device, a bicycle, or any type of device that one could imagine that is capable of being remotely controlled by logical rules. Also, the types of items that could be purchased or used by the device or ways in which the device can be controlled are only limited by the nature of the device. While a cellular phone is usually used to make phone calls, it can also be used for many other functions, including send and receive text messages, download and play games, music, movies, etc., and even make purchases of other objects or services that have nothing to do with the device, such as a gift at a shop, or a drink from a soda machine.

As illustrated in FIG. 1, the phone or mobile station 10, such as a cellular phone, smart phone, personal data assistant (PDA), or any other type of mobile computing platform, is utilized to originate a service, such as a call or message, using common standardized methods, e.g., as defined in IS-136 (a TDMA standard), IS-95 (a CDMA standard), etc. The phone/mobile station 10 would first establish a connection with a base station 12, which would in turn connect to an originating mobile switching center (O-MSC) 14. Upon receiving the origination request for a service from the base station 12, the O-MSC 14 would attempt to authenticate the mobile station 10 by querying a visitor location register 16 and a home location register 18 to determine if the mobile station 10 is registered with the telecommunications network and authorized for use on that network, collectively referred to as "validation."

Upon successful validation, the O-MSC 14 would trigger the service manager 20, based on standardized methods, e.g., as defined in IS-41, IS-771, IS-826, etc. The service manager 20 would first authenticate the subscriber of the mobile station 10 based on their mobile directory number (MDN) and/or their mobile subscriber identification (MSID), or some other type of identifier, as a valid subscriber. The term "subscriber" is used to generically define the person or entity that subscribed the phone to the telecommunications network, whether that happens to be the user or an administrator. If the subscriber is not valid, the subscriber will be notified through the mobile station 10 and the session will be terminated. If the subscriber is valid, the service manager 20 will then enforce the provisioned voice or data policies or rules for the particular user of the mobile station 10, which includes, but is not limited to, wallet balance, wallet state/status, provisioned services, other functions or functional restrictions (such as contact restrictions, time-of-day restrictions or allowed number list functions/blocked number list restrictions), user selected service controls, etc. If the user fails any of the provisioned policies, the user will be notified and the session will be terminated. The provisioned policies are established by one or more global rules and/or one or more local rules, as further described below. Operation of the service manager with respect to data service feature management (data policy) establishment and enforcement is further illustrated in FIG. 2.

If the session is allowed to progress, the service manager 20 will then rate and charge the service transactions requested during that session. To do this, the service manager 20 again looks to the global level rules and the user level rules that have been established for the device in question. In addition to including or establishing the provisioned policies, the rules establish an order of precedence as to how the device/phone is to be administered and how authorized transactions are going to be charged. The global rules are checked first. If a service transaction requested can be categorized according to one of the global rules, the service transaction will be rated and charged according to the global rules. For example, the phone service provider could establish that any call to its customer support phone numbers will be allowed and should always be free to its users, in which case the user level rules would not apply.

The user level rules define how a user is to be rated and charged once it is determined that the global level rules do not apply to the service transaction request and/or payment. Additional rules can also be established that work in between the global rules and the user rules, such as promotional wallet rules and dynamic wallet rules. These additional rules can be integrated as follows: for each phone/mobile station, the service manager 20 has a variety of phone/mobile station wallets allocated to support multiple services and functions, such as a user wallet, and administrator wallet, and a promotional wallet. If the service transaction request has been authorized by the global rules, the service manager 20 would then check to see if the service transaction could be charged to another wallet.

For example, a promotional wallet could be established to discount certain transactions, or to provide rewards or credits for particular services, or to provide certain free transactions. If the promotional wallet applies and there is a sufficient balance in the promotional wallet, then the promotional wallet would be decremented (unless the promotional wallet was being incremented for use of a service instead). If the service transaction is not a promotional activity, the service manager 20 will apply other user level rules and either charge the user's wallet or the administrator's wallet. Dynamic wallets are further described below, but they would work in a similar fashion.

Whether a charge for a service transaction is taken from the user's wallet, the administrator's wallet, or some other wallet, depends on the user level (local) rules established by the administrator for that user. Hence, the administrator has the ability to specify unique service transactions as being charged to their wallet versus the user's wallet through use of unique identifiers for each service transaction (e.g., MDNs to be charged to the administrator's wallet for voice/SMS/MMS, content identifiers to be charged to the administrator's wallet, IM screen names to be charged to the user's wallet, etc.). In the context of a pre-paid phone, a wallet would typically include a balance that corresponds to some amount of United States Dollars deposited with the service provider. In other contexts, as noted above, a wallet could be designed to hold any unit of value in place of dollars, including other currency types, service units, assets, or even something completely made up that only has value in some limited context, like virtual money in a multiplayer, on-line, role playing game.

Once the service transaction has been rated and charged, the service transaction is permitted to continue. If the service transaction is a call, a download, a text message or any other service that requires the user's phone/mobile station 10 to be connected to another mobile station or device connected to a mobile station, a connection would be established to the terminating mobile switching center (T-MSC) 22 and then connected to the mobile station 24, assuming mobile station 24 or the device connected to it is available and the service transaction can be completed.

Figure 2:
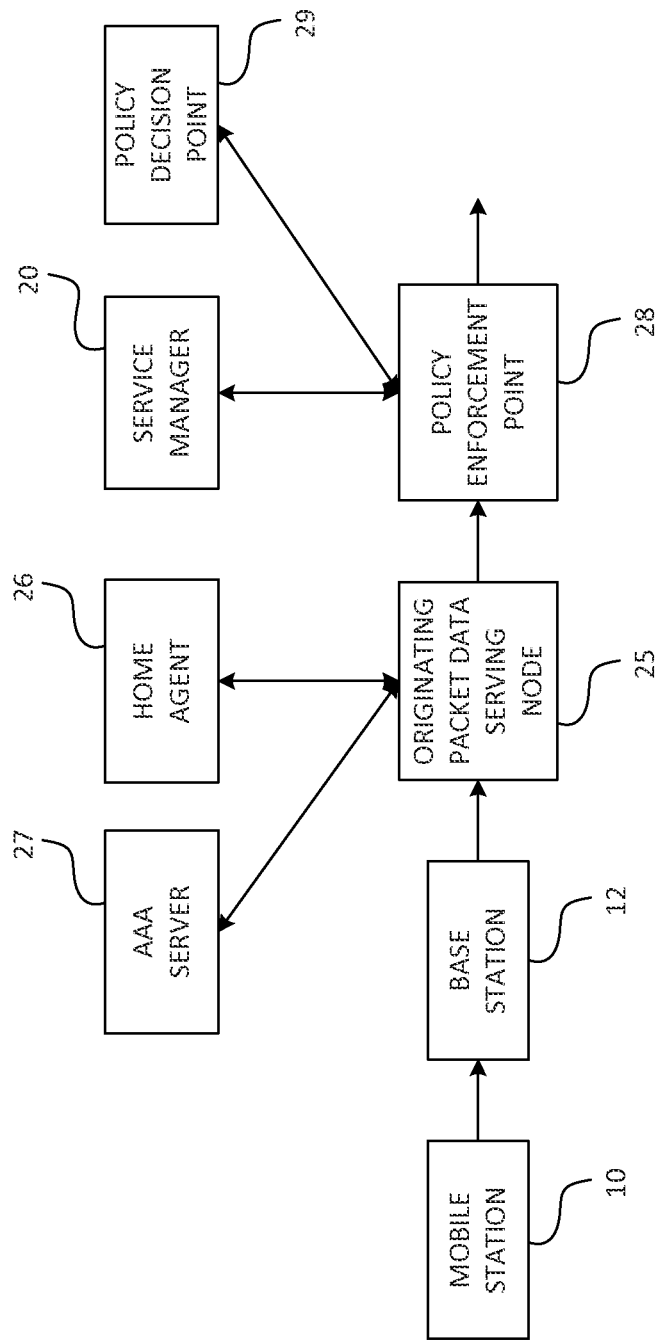
FIG. 2 is a flow chart illustrating the process of initiating a data session for a mobile device, checking the data policies associated with that device, and enforcing those data policies.

FIG. 2 provides a description of how a mobile communication device is utilized to originate a data session and how data service feature management operates. As in FIG. 1, the mobile station 10 originates a session (data in this case, but could also be voice as shown in FIG. 1) by establishing a connection with base station 12, which in turn connects to an originating packet data serving node (O-PDSN) 25. The O-PDSN 25 acts as a gateway by providing access to the Internet, intranets and applications servers for the mobile station 10 and acts as a client for the home agent 26 and the authentication, authorization and accounting (AAA) Server 27. Upon receipt of an origination request for a service from the base station 12, the O-PDSN 25 will attempt to validate the request. Validation involves first attempting to authenticate the mobile station 10 by querying the AAA Server 27 and the home agent 26 to determine if the mobile station 10 is authorized to perform the requested action within the carrier network. If the mobile station 10 has been validated, the O-PDSN 25 will obtain an IP address for the data session and route the mobile station 10 to the appropriate policy enforcement point (PEP) 28.

The PEP 28 is a logical element that can be physically housed in another packet data serving node or a gateway device, depending on the service request, such as a wireless application protocol (WAP) gateway, instant messaging gateway, email gateway, multimedia messaging service gateway, etc. The PEP 28 is responsible for enforcing a decision by the service manager 20 and policy decision point 29 to accept or reject the service request.

The PEP 28 operates in conjunction with the policy decision point (PDP) 29, and depending on the configuration of the network possibly the service manager 20, to authenticate the subscriber of the mobile station 10 as a valid subscriber, based on their MDN and MSID, or some other type of identifier. The PDP 29 is also a logical element that can be physically housed in the service manager 20 or in another server accessible to either the service manager 20 or the PEP 28. The PDP maintains or stores a list of policies that have been established to control the features and functions of the mobile station 10 and decides, based on those policies, to either accept or reject the service request.

Such requests might be initiated by the device, such as when the user of the device sends a request to download some type of content, such as a game, a ringtone, a website, a picture message, a text message, etc. In other cases, the request might be initiated by another device seeking to communicate with the user's device. For example, the user of mobile station 10 might have a text message sent to her/him by a friend, but if a policy is in place that prevents the user from receiving text messages at the time the message is sent, then the request to communicate with the user will be denied. Likewise, the user's request may not have anything to do with making a call or downloading content, but rather just to use some feature or function of the device, such as a game that is already stored on the device. Even in this instance, the device would need to communicate with the PDP to determine if a policy is in place that would prevent use of the feature or function for some reason, such as the wrong time of the day, the wrong day of the week, the game has been played in excess of some time limit set on the game, etc.

In situations where the subscriber is not valid, PEP 28 will notify the subscriber through the mobile station 10 and take one of a number of different possible actions, such as terminating the session or transaction associated with the service request, redirecting or rewriting the session or transaction, degrading the session or transaction to a lower quality or class of service, etc. If the subscriber is valid, PEP 28 will enforce the provisioned policies for the particular subscriber of the mobile station 10. As noted above, these policies can cover many different rules that apply to the features or functions of the device based on requests sent to or received from the device. These policies, include those items noted above, but also include many other things, such as wallet balances, wallet state/status, provisioned services/features, user selected service controls, and other functions or functional restrictions, such as URL restrictions, content type restrictions, time-of-day restrictions, quality/class of service restrictions, etc.

If any of the provisioned policies fail (e.g., a restriction is met), the subscriber is notified and the PEP 28 will take one of a number of different possible actions, such as terminating the session or transaction, redirecting or rewriting the session or transactions, degrading the session or transaction to a lower quality or class of service, etc. When the requester is not the subscriber, it may be preferable to notify the requester or notify both the requester and the subscriber. For example, if someone attempted to call the user, or send an email, Instant Message, or text message to the user, and there was a policy in place that prevented the call or communication, then it might be necessary to tell that someone so they know why they cannot contact the user at that time. It may also be necessary to notify the subscriber or an administrator so they know what happened as well. If all of the policies pass, then the session or transaction associated with the service request is permitted to continue.

Wallets can be set up and administered in a number of different ways. For example, in the pre-paid cell phone context, the administrator and user could sit down together at a computer connected to a website associated with the service provider of the phone and view and/or edit wallet settings for that user's phone. The administrator could also call the service provider and administer the user wallet and administrator wallet over the phone. While the user wallet is generally going to be associated with the device being used, which itself will have some form of unique identifier, the administrator wallet will not necessarily be tied to just the one device. Hence, the administrator wallet, like any of the other wallets that could be established (promotional, dynamic) just needs to have a unique identifier that could be used to associate the administrator wallet with each of the devices it will be managing.

Figure 3:
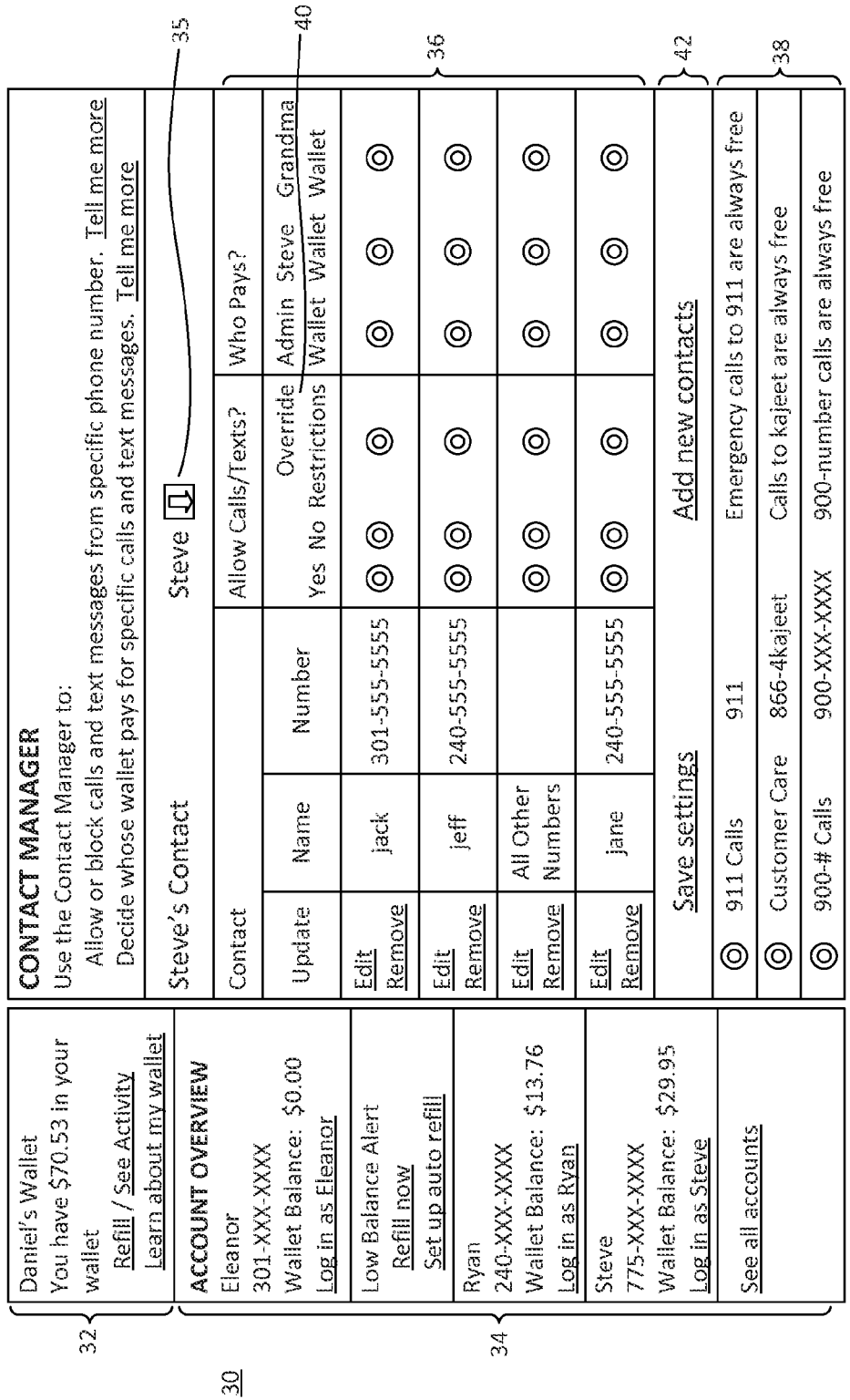
FIG. 3 is a block diagram illustrating a contact management feature.

An example of a system for managing a number of user wallets from within a single administrator wallet, in accordance with a preferred embodiment of the present invention, is illustrated in FIG. 3. The Contact Manager 30 generally illustrated in FIG. 3 is in the form of a webpage on a website that enables an administrator to manage one or more wallets associated with that administrator and/or multiple users. The Contact Manager 30 can also be used by the users to manage their user wallets in a similar fashion. Since the Contact Manager 30 illustrated in FIG. 3 is a webpage, underlined text indicates hypertext or hyperlinks that can be selected with a pointing device to go to other webpages or even other websites.

As shown in FIG. 3, Daniel is the administrator, as indicated in area 32 and has administrative rights over three shown users, Eleanor, Ryan and Steve, and an unspecified number of additional users. The wallet summaries for Eleanor, Ryan, and Steve are shown in the Account Overview area 34. The additional user wallets would be visible if the "See all accounts" option, located below area 34, was chosen.

Daniel is shown to have a balance of $70.53 USD in his administrator wallet shown in area 32. Eleanor's name, phone number, and a balance of $0 USD in her wallet, are shown in the upper part of Account Overview area 34. Likewise, Ryan's and Steve's names, phone numbers, and wallet balances are also shown in area 34. Both Ryan and Steve have positive cash balances in their wallets. Because Eleanor has a zero balance, she also has a low balance alert shown below her wallet summary to alert Daniel. As Eleanor has a zero balance, she cannot initiate a service unless Daniel has indicated that he would be willing to pay for the service from his wallet or has authorized some other wallet to apply to any service transaction desired by Eleanor.

Based on this alert, Daniel is presented with the options of informing Eleanor to add money to her wallet or adding money to Eleanor's wallet on his own. Although many different methods of refilling a wallet could be provided, the two options shown are to refill Eleanor's wallet now or to set up an automatic refill for Eleanor's wallet. The refill and auto-refill options are further discussed with respect to FIG. 3 below. The low balance alerts could also be set at different levels other than zero. The administrator or the user could set the low balance level for a wallet at $5 USD or $10 USD, or set multiple low balance alerts that are each treated the same or in different ways. For example, a first alert could be sent only to the user, such as through an email, a text message, or in some other manner, while a second lower balance level alert was sent only to the administrator.

The Contact Manager 30 serves a number of purposes, including: (1) to enable the administrator to manage all of the wallets associated with that administrator; (2) to establish certain general rules that control device functions and payment; and (3) to establish certain local rules that control device function and payment. As shown in FIG. 3, Daniel has chosen to manage Steve's wallet. The arrow 35 next to Steve's name would activate a drop down menu that would enable Daniel to select a different user wallet to manage, such as Eleanor's wallet or Ryan's wallet. Since Steve's wallet has been selected, Steve's Contacts are illustrated in the local rules area 36. The global rules associated with Steve's wallet are illustrated in the global rules area 38.

The Contact Manager 30 could be configured to enable Daniel to manage many additional or different services or functions (downloads, etc.) for Steve in the same manner as calls and text messages are illustrated in areas 36 and 38. For example, in addition to indicating the names and numbers of people that Steve can or cannot communicate with by calls or text, referred to herein as allowed number lists/blocked number lists or contact management function, the Contact Manager 30 could also be configured to enable Daniel to select and manage the features or functions of Steve's phone that Steve could use, such as the ability to use the wallet to pay for physical goods at a store using the phone, (i.e., a feature management function), or the time of day during which the phone could be used in general or for specific purposes (e.g., okay to call Jeff, but only between 3 pm and 6 pm), i.e., a time management function. A separate page could also be provided, as illustrated in FIG. 4, that combines various restrictions on specific features, such as choosing for Steve when that feature can be used, how much it can be used (if at all), and who is going to pay for the feature or function. Dynamic wallets could also be managed on that web page or on another web page on a per-person or per-feature basis.

As used herein, the term blocked number list refers to a list of phone numbers that have been blocked, both in terms of sending calls/texts to Steve's phone and receiving calls/texts from Steve's phone. The term allowed number list refers to a list of phone numbers that have been permitted, both in terms of sending calls/texts to Steve's phone and receiving calls/texts from Steve's phone.

Although many different functions associated with Steve's phone could be managed through Daniel's wallet, in order to more clearly illustrate how the Contact Manager 30 would be used to manage Steve's wallet, FIG. 3 only illustrates one function, the contact management function. The additional functions, such as feature management and time management would be similarly structured and could be shown as part of the Contact Manager 30, or as separate management functions on other web pages, as illustrated in FIG. 4. In addition to managing a specific function within a function manager, it is also possible to override functional controls within one function manager from within another function manager. This point is further described below with respect to the "Override Restrictions" feature 40 of the Contact Manager 30.

The local rules established for Steve in local rules area 36 include the contact and payment rules associated with three specific people and their phone numbers and the general category of "All Other Numbers." For each contact, Daniel can decide to either allow calls/texts to the contact, or to block such calls/texts, by clicking on the circular radio buttons illustrated in area 36. When a radio button has been selected or clicked, the central area of the radio button is darkened. When the radio button has not been selected, the central area is clear. Daniel can also specify whose wallet will be used to pay for any such calls/texts.

As illustrated, calls/texts to Jack are allowed and are to be paid for out of Daniel's wallet. Since Daniel is the administrator of Steve, Daniel's wallet is referred to as the "Admin Wallet." Different language, other than "Admin Wallet," could obviously be used in different contexts. For example, if Daniel was Steve's parent, Daniel's wallet could be referred to as a parent wallet. If Daniel was an employer and Steve an employee, Daniel's wallet could have a different name, etc. Since Daniel has indicated he would pay for any call to or from Jack and Steve, even if Steve had no money is his wallet, Jack and Steve would still be allowed to communicate and the charges would be charged to Daniel's wallet.

While calls/texts with Jeff are also permitted, they are to be paid for by Steve out of his wallet, since Steve's wallet has been selected. If Steve runs out of money in his wallet, however, he would no longer be able to communicate with Jeff until Steve refilled his wallet because neither the Admin wallet nor Grandma's wallet has also been selected. It should be noted therefore that the wallets are not mutually exclusive. Hence, with respect to Jeff, both Steve and Grandma's wallet could be selected at the same time, or even all three wallets (Admin, Steve and Grandma) could be simultaneously selected. In such a case, additional local rules would be used to establish an order of precedence between each of the wallets. For example, calls with Jeff would first be paid for by Steve, but when Steve ran out of money, Grandma would cover the cost of such calls, either for a limited amount of money, for a limited amount of time, or until Grandma ran out of money as well, in which case the Admin wallet would be charged. Many other orders of precedence could obviously be established.

With respect to Jane, any call or texts are permitted and will be paid for out of Grandma's wallet. In this case, Grandma's wallet is a dynamic wallet that is associated with Steve's wallet and Steve's device, but is not controlled by Grandma. Grandma has set up a wallet, put funds in it and indicated to Daniel that her wallet can be used by Steve for the specific purpose of calling Jane. Grandma's wallet could also be associated with any of a number of different administrators, and different users, for different purposes and functions with respect to each user. In this case, Grandma's wallet only has a unique identifier that enables it to be associated with other wallets as she so directs, but is not associated with any particular device, per se. Grandma's wallet could also just be associated with Steve's wallet or even the Admin wallet without any specific function associated with it. Thus, Steve and the Admin could use the funds in Grandma's wallet, as determined by the Admin, for any purpose they might choose.

Also shown in FIG. 3 is the name of "All Other Numbers." Because the "No" choice was selected for "All Other Numbers," no calls/texts to or from any numbers other than those shown in the local rules area 36 are permitted by the local rules. Since no communication is permitted with numbers other than Jack, Jeff and Jane, there is no need to designate whose wallet would be charged for such communication. FIG. 3 further illustrates an "Override Restrictions" function 40, which serves as a local rule that can be used to override any restrictions on functions applicable to Steve, such as a time of day restriction. An override restriction could be set up to be very narrow or very broad. As illustrated in FIG. 3, the override restriction is unspecified, so it could apply to only a narrow set of functional restrictions established by other local rules on web pages not shown herein, or to any other functional restrictions that could have been established.

The Override Restrictions feature 40 can be useful for parents that want to restrict generally when a child can use a phone, except with respect to communication with certain people. For example, if Jack was a child care provider for Steve, Daniel would want Steve to be able to contact Jack at any time, and vice versa, even if Steve was not otherwise allowed to use his phone between 9 am and 3 pm, i.e., during school hours. The ability to regulate when a phone can be and cannot be used can also be of value to parents and school districts with respect to resolving one of the greatest conflicts that exist between parents/students and school administrators—mobile phone usage by kids. Parents want children to have a mobile phone with them so the child can call the parent if need be, i.e., if someone forgets to pick the child up after school. School districts do not want the children to have the phones at all because the students tend to misuse the phones, i.e., to call friends during school, to cheat, to engage in illegal activity, etc. While the school districts believe that children should be relegated to only using the school phones if the children need to contact a parent, the parents want the children to have the phones with them in case they get locked out of the school, get lost on a field trip, etc.

The override restrictions feature 40 can be used in many other contexts as well and is not limited to just overriding a restriction on time of day usage, which could be the manner in which this function is used with respect to FIG. 3. Basically, any restriction that might be in place due to a local rule could be set up to be overridden. If another local rule was established to regulate the downloading of some game, or the use of some other features/functions, or the use of the device in some other context, activation of the override restrictions function would cause that local rule restriction to be by-passed until the override restrictions function was deactivated.

As illustrated in FIG. 3, only Daniel is permitted to manage Steve's phone, but Steve's phone could also be set up to be managed by Steve's school as well. For example, Daniel could register with a mobile phone service through the school that permits Steve to have his phone with him at school, rather than in a locker, but which tightly controls how the phone can be used during school hours. For example, only certain functions or features could be enabled during school hours so the phone could not be used to cheat, or to play games, or to call other students, but the phone could be used to call/text a parent or certain other people that were permitted to be called. If Steve's phone had some form of location feature associated with it, i.e., a feature that enabled the phone's location to be roughly estimated, the school control function could be set to only be operational when Steve's phone was on school property. In this manner, if Steve had to walk home, or was on a field trip, the phone would still work as permitted by Daniel, even if the school had other limiting control on Steve's phone at that time. Additionally, the school could decide to restrict functions or features by specific groups, such as by grade or by people participating in specific activities.

Area 42 includes additional functions that enable changes to area 36 and 38 to be saved, or for new contacts to be added.

Obviously, the local rules could be much more extensive than as illustrated in the local rules area 36 of FIG. 3, which is also true with respect to the global rules shown in global rules area 38. As illustrated in FIG. 3, only three global rules are illustrated: (1) 911 calls are allowed and are always free; (2) Customer Care Calls are always allowed and are free; and (3) 900-number Calls are not allowed. Since these are global rules, even though the local rules do not allow calls and texts to or from numbers other than those contacts listed in Steve's contact, calls to 911 and to Customer Care Calls would be permitted despite the local rules. In the same context, even if the local rules permitted calls to other numbers, by selecting a global rule blocking 900-number calls, the global rule applies first and the local rules are not considered.

Although the administrator wallet would typically be arranged to cover zero balances in the user's wallet, this arrangement could be reversed under certain circumstances. For example, if a service was designated as being paid from the administrator's wallet, but the administrator's wallet had a zero balance, rather than block the service, the payment could be set to revert back to being paid by the user's wallet, or another wallet (Grandma's wallet) as described above. This type of arrangement ensures maximum security for both the administrator and the user with respect to important services, provided any of the other wallets have money in them.

In addition to paying for certain services, the administrator can choose to move funds or units of value, such as airtime and service units, between wallets. For example, the administrator could manually transfer $10 USD from the administrator's wallet to the user's wallet at any time, or the administrator could set up an automatic transfer of specified amounts at specified times. In the context of a parent administrator and a child user, a transfer of money from the administrator's wallet to the phone user's wallet could be structured to mirror a real-world "allowance." The administrator could also move funds/units between different user wallets or even permit or control how different users "trade" funds/units between their wallets. For example, two employees might trade funds between their wallets or two children might trade electronic toys, merchandise, phone usage units, or funds for their phones through their wallets.

As previously referenced, FIG. 3 illustrates how an administrator can control features or functions associated with a subscribers phone, in that case who the subscriber can call or not, and who pays for which calls, but could also be configured to enable the administrator to control more features and functions. Alternatively, a separate application or web page 50 could be established to enable the administrator to control various additional features or function, as illustrated in FIG. 4. As shown in FIG. 4, the administrator of the account for a subscriber named Mike is given the ability to manage five additional features associated with Mike's Kajeet™ phone (kajeet is a trademark of kajeet, Inc.), certain types of downloads 52 (e.g., ringtones, wallpaper, games and applications), feeds 54, mobile web surfing 56, picture messaging 58 and instant messaging 60.

For example, Mike's parent could decide that picture messaging is too dangerous for Mike because of his age and decide to disable that feature. To do so, as illustrated in FIG. 4, the parent would select the "Edit Setting" link with picture messaging 58, and then change the setting from its current setting of "Allowed" to "Not Allowed," as is the case with mobile web surfing 54 as shown in FIG. 4. Mike's parent could likewise decide to enable an instant messaging subscription. As shown in FIG. 4, instant messaging 60 is currently set to "Unlimited Monthly," but it could be set to "Not Allowed" or "50 Message/Month" or "$10/Month," or almost any other setting that made sense to use.

The parent could also have the option of enabling or disabling a group of services all at once, as illustrated in FIG. 5. In this case, when the "Edit Setting" link for feeds 54 was selected, a new feeds page 70 was displayed that presented the parent with the ability to allow or disallow feeds, which are a form of text messaging. As shown in FIG. 5, turning off feeds would disable all SMS or text messaging, not just the feeds described on page 70. Naturally, feeds page 70 could be set up differently, so that text messaging was allowed, except for text messages being sent by kajeet, or maybe only certain types of text messages sent from kajeet—the options are truly endless. Likewise, any feature could be established to be configured by the user in many different ways. For example, instead of having separate settings for downloads 52, mobile web surfing 56, and instant messaging 60, all three of these features could be disabled with a single "off" switch, etc.

The actual users of the phone might also have the same or similar options with respect to the feature manager as the administrator, but the administrator might have the ability to override the user and/or prevent the user from doing something in the future. Alternatively, the user could have functions that they could enable on their own. For example, a child using a cell phone might have the ability to sign up for Instant Messaging 60, but the parent might decide that it costs too much money, turn the subscription off, and prevent the kid from signing up for it again. Likewise, a child might be able to turn on ringtones and wallpaper downloads 52, which the parent could then turn off if needed, but only the parent could turn on games and applications. As previously stated, the combination of options is unlimited.

Further enhancements to the feature manager could include the ability to limit how much of a specific feature can be used, when it can be used, whether dynamic wallets can be used with that feature, picking a group of users attached to that account that the settings apply to, etc.

As previously noted, a service provider could also establish promotional wallets or enable dynamic wallets. Although the global rules and local rules determine the interaction between user wallets and administrator wallets, as additional types of wallets are added, a hierarchy between the wallets would be required to ensure that requested services were taken from the most appropriate wallet first. Under this hierarchy, before the global or local rules were checked to determine which wallet was designated by the administrator to pay for a service, the promotional wallet would be checked to determine if the service would be covered by the promotional wallet. For example, if a promotion involved giving 10 free voice minutes to a user, those 10 minutes would be placed in a "voice" promotional wallet that would then be used first before determining whether additional minutes would be taken from the user's wallet or the administrator's wallet.

However, the global and local rules would still need to be checked to make sure that the service was permitted. This prevents a promotional wallet from being used to call a 900-number when calls to 900-numbers would otherwise be blocked by the global rules.

As discussed above with respect to Grandma's wallet in FIG. 3, a dynamic wallet would be a wallet that was set up by someone, like a grandparent, but that was not necessarily tied to any particular user or device/phone number. Like the other types of wallets, a dynamic wallet could be filled with funds or units and used to enable a variety of services for a number of other users or the user of the dynamic wallet by either being associated with one or more devices or one or more wallets. To prevent conflicts with an administrator's wallet or a user's wallet, a dynamic wallet would not be able to authorize services for a user that were blocked by the administrator, but could pay for those services that were allowed. A dynamic wallet could also be configured to take precedence over a promotional wallet or even a user's wallet with respect to paying for services, or could simply be used as an additional backup wallet in the unlikely event all of the other wallets for a phone were not available, as previously described.

Although the wallets described herein are described in the context of being used with a mobile device, particularly a pre-paid cellular phone, wallets could be associated with any type of communication device, as described above. Some of the key features of wallets in the context of the present invention are: (1) that they enable real-time management or control of a device; (2) that each device requires at least two wallets to be associated with it, at least one user wallet and at least one administrator wallet; (3) that an order of precedence can be established between the wallets, as to which wallet pays for what, and any wallet can be used to back up a payment by a second wallet in the event the second wallet is low on funds/credits; and (4) that local rules and global rules can be established for the wallets that enable the administrator to manage the functions of a device in many different ways, including who can be contacted, what transactions are permitted, what time of day the device and features/functions can be used, what features or functions are enabled, etc. Global rules and local rules can be applied in order, so as to result in two separate decisions, or at the same time as a single decision (e.g., if local rule X is true and global rule Y is true, then allow the function to proceed).

Hence, the present invention, while illustrated and described in terms of a preferred embodiment and several alternatives herein in association with the various drawing figures, should not be limited to just the particular description contained in this specification. Additional alternative or equivalent components and steps could be used to practice the present invention.

What is claimed:

1. A system for managing a mobile device, the system comprising a memory bearing instructions that, when executed on the system, cause the system to at least:
   receive information associated with an administrator of the mobile device, the information being indicative of a plan to charge units of value allocated from the plan and associated with a first function among one or more functions of the mobile device to a first account associated with the administrator or units of value allocated from the plan and associated with a second function among the one or more functions of the mobile device to a second account associated with a user;
   generate an allowance associated with the user based on the received information, the allowance comprising one or more limits within which units of value associated with the one or more functions of the mobile device are charged to the first account or the second account based on the plan and outside of which units of value associated with the one or more functions of the mobile device are charged to the first account or are blocked;
   determine whether a function initiated at the mobile device qualifies as the first function or as the second function and whether units of value associated with performing either the first function or the second function is within or outside of the one or more limits;
   allow execution of the initiated function on the mobile device based on whether the initiated function qualifies as the first function or the second function, whether units of value for execution of the initiated function is within or outside of the one or more limits; and
   charge the associated units of value to the first account or the second account based on the determination.

2. The system of claim 1, wherein the first function comprises an interaction with a remote device associated with one or more trusted contacts, and wherein the second function comprises an interaction with a remote device associated with a contact other than the one or more trusted contacts.

3. The system of claim 1, wherein the one or more limits are associated with units of value used to charge for performing the one or more functions on the mobile device.

4. The system of claim 1, wherein the one or more limits are associated with a restriction imposed on one or more of making a call, receiving a call, sending a message, receiving a message, accessing a website, conducting a purchase, and downloading an application.

5. The system of claim 1, wherein the execution of a function among the one or more functions is blocked when the function qualifies as the first function and when the first account lacks sufficient funds to pay for the execution of the function.

6. The system of claim 1, wherein the execution of a function among the one or more functions is blocked when the function qualifies as the second function and when the allowance lacks sufficient funds to pay for the execution of the function.

7. The system of claim 1, wherein the execution of a function among the one or more functions is allowed when the function qualifies as the first function and when the first account comprises sufficient funds to pay for the execution of the function.

8. The system of claim 1, wherein the execution of a function among the one or more functions is allowed when the function qualifies as the second function and when the allowance comprises sufficient funds to pay for the execution of the function.

9. The system of claim 1, wherein the execution of a function among the one or more functions is allowed when the function qualifies as the first function and when the allowance comprises sufficient funds to pay for the execution of the function.

10. A method for managing a mobile device, the method comprising:
   receiving first information from a computing device associated with an administrator, the first information being indicative of an allowance to be associated with an account of a user of the mobile device;
   receiving second information from the computing device, the second information being indicative of whether units of value associated with a function of the mobile device is to be charged to the allowance or to an account of the administrator;
   generating a plan based on the first information and second information, the plan associating the allowance with the account of the user and comprising a rule for determining when to charge the units of value associated with the function of the mobile device to the allowance and for determining when to charge the cost units of value associated with the function to the account of the administrator;
   determining whether a units of value of a digital communication associated with a function of the mobile device should be charged to the allowance of the account or the administrator based on the rule; and
   facilitating the digital communication by charging the units of value of the digital communication to the allowance or to the account of the administrator based on the determination.

11. The method of claim 10, wherein the allowance comprises units of value used to pay for a service provided by a service provider of the mobile device.

12. The method of claim 10, wherein the rule determines that, when the function is executed on the mobile device, units of value associated with the execution is charged to the allowance when the allowance comprises sufficient funds to pay for the units of value.

13. The method of claim 10, wherein the rule determines that, when the function is executed on the mobile device, units of value associated with the execution is charged to the account of the administrator when the allowance lacks sufficient funds to pay for the units of value and when the account of the administrator comprises the sufficient funds.

14. The method of claim 10, wherein the rule comprises a list of one or more remote devices and determines that, when the function is executed on the mobile device, units of value associated with the execution is charged to the account of the administrator when the allowance lacks sufficient funds to pay for the units of value, when the account of the administrator comprises sufficient funds to pay for the units of value, and when the execution causes the device to interact with a remote device from the list of the one or more remote devices.

15. The method of claim 14, wherein the list of one or more remote devices is defined based on the second information.

16. The method of claim 14, wherein the list of one or more remote devices is defined based on third information received from the computing device associated with the administrator, the third information being indicative of one or more contacts associated with the one or more remote devices.

17. The method of claim 10, further comprising sending a notification to the computing device associated with the administrator when units of value in the allowance reach a predefined threshold.

18. A system for managing a mobile device, the system comprising a processor and a memory communicatively coupled to the processor, the system further comprising:
   means for receiving first information from a computing device associated with an administrator, the first information being indicative of an allowance to be associated with an account of a user of the mobile device;
   means for receiving second information from the computing device, the second information being indicative of whether an execution of a function of the mobile device is to be charged to the allowance or to an account of the administrator;
   means for providing a plan based on the first information and second information, the plan associating the allowance with the account of the user and comprising a first rule for determining when to charge units of value for the execution of the function on the mobile device to the allowance and for determining when to charge units of value for the execution of the function to the account of the administrator;
   means for determining whether units of value for a digital communication associated with the execution of the function of the mobile device should be charged to the allowance of the account or the administrator; and
   means for facilitating the digital communication based on the determination by charging the units of value for the digital communication to the allowance or to the account of the administrator.

19. The system of claim 18, further comprising means for updating the plan in real-time based on updated first information or updated second information received from a computing device associated with the administrator.

20. The system of claim 18, wherein the plan comprises a second rule for determining when to avoid charging the allowance and the account of the administrator when the function is executed on the mobile device, the second rule being defined based of a third party and being unmodifiable by the administrator.

21. The system of claim 18, wherein the plan comprises a list of one or more contacts associated with one or more remote devices, the list being defined based on the second information.

22. The system of claim 21, further comprising means for disabling the digital communication, wherein the digital communication is disabled when the allowance lacks sufficient funds to pay for the digital communication and when the digital communication causes the mobile device to interact with a remote device associated with a contact not found on the list of one or more contacts, and wherein the digital communication is facilitated when the allowance lacks sufficient funds to pay for the digital communication and when the digital communication causes the mobile device to interact with a remote device associated with a contact found on the list of one or more contacts.

* * * * *